Figure 1:
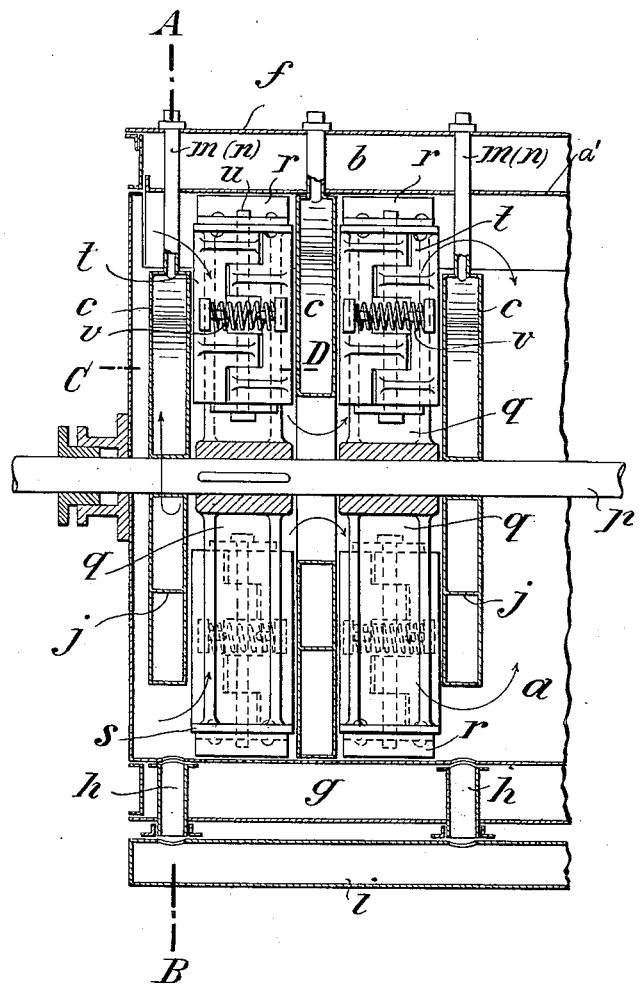

P. PORGES & R. NEUMANN.
APPARATUS FOR COOLING PARAFFIN OR THE LIKE.
APPLICATION FILED MAY 29, 1911.

1,017,587.

Patented Feb. 13, 1912.
2 SHEETS—SHEET 1.

Witnesses:
R. Dommers
Elizabeth Leckert

Inventors:
Philipp Porges
Richard Neumann,
By Henry Orth Jr.
Atty.

P. PORGES & R. NEUMANN.
APPARATUS FOR COOLING PARAFFIN OR THE LIKE.
APPLICATION FILED MAY 29, 1911.

1,017,587.

Patented Feb. 13, 1912.

2 SHEETS—SHEET 2.

Witnesses:
R. Dommers
Elizabeth Lechut

Inventors:
Philipp Porges
Richard Neumann,
By Henry Orth Jr.
Atty.

UNITED STATES PATENT OFFICE.

PHILIPP PORGES, OF VIENNA, AND RICHARD NEUMANN, OF BRÜNN, AUSTRIA-HUNGARY.

APPARATUS FOR COOLING PARAFFIN OR THE LIKE.

1,017,587. Specification of Letters Patent. Patented Feb. 13, 1912.

Application filed May 29, 1911. Serial No. 630,196.

*To all whom it may concern:*

Be it known that we, PHILIPP PORGES and RICHARD NEUMANN, both subjects of the Emperor of Austria-Hungary, residing at Vienna, Austria-Hungary, and at Brünn, Austria-Hungary, respectively, have invented certain new and useful Improvements in Apparatus for Cooling Paraffin or the Like; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The known apparatus for cooling paraffin-oil or the like by means of plate-shaped cooling bodies, combined to form a battery within a tank and scraped by rotary scrapers, do not for sundry reasons fully satisfy the requirements, viz. to obtain a thorough cooling and to prevent at the same time a freezing of the materials to be cooled onto the cooling surfaces.

Notwithstanding the fact, that the scrapers are sweeping over the whole surface of the cooling bodies proper, great cooling surfaces remain unscraped, especially the side walls vertically arranged at both sides of the tank. These surfaces are not cooled directly but indirectly. In the practical use of such apparatus the fastening devices, as brackets and the like, by means of which the cooling bodies are connected with or fastened to the tanks, transmit by thermal conduction the heat with such an intensity, that the said surfaces, after a working of some hours, will become gradually covered with a crust of paraffin, attaining a thickness of 10 to 12 cm., and which can not be scraped off. This circumstance is due to the fact, that the rotating scrapers are sweeping only over the cooling surfaces proper, and can not reach the said vertical surfaces at all. This effect becomes yet more pronounced if, for the purpose of increasing the efficiency of the apparatus, the tank is provided besides with an exterior cooling jacket. The crusts thus formed have the disadvantage of considerably diminishing the volume of the cooling apparatus available for being pumped out; besides, sometimes it occurs that the said crusts suddenly separate from the walls in large chunks, choke the apparatus and damage the stirring mechanism. Furthermore, in the paraffin-oil cooling apparatus, the whole of the contents should be brought into contact with the cooling surfaces by agitating; the known trough-shaped apparatus with vertical side walls can however not meet this requirement as the great quantities of oil filling the tank above the cooling-plates or bodies, and being out of reach of the rotating mixing wing, are not stirred up, so that the result will be an unequal and insufficient cooling.

Figure 2:
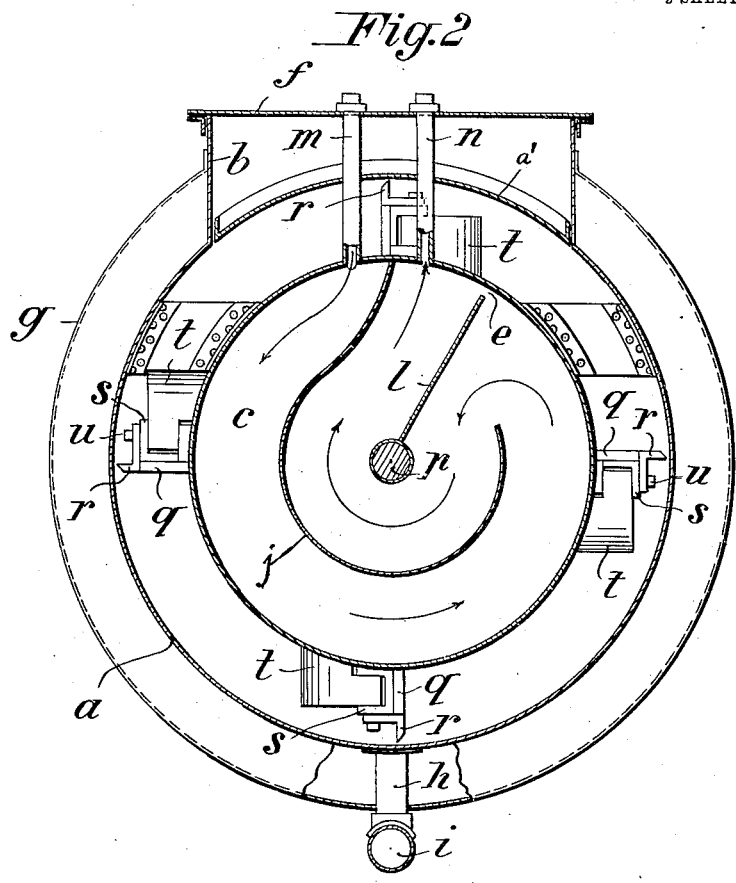
Figure 3:
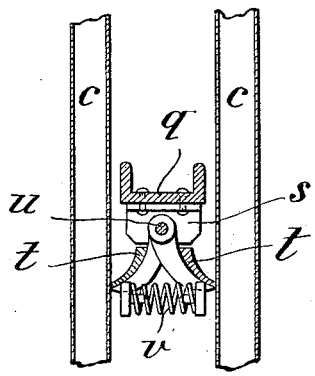

The said disadvantages are completely overcome by the apparatus forming the object of the present invention; this apparatus is shown in the accompanying drawings and viz: in Figure 1 in longitudinal section, in Figs. 2 and 3 in two cross-sections on the lines A—B and C—D respectively of the Fig. 1.

The tank for the reception of the paraffin-oil to be cooled is made in the form of a horizontal cylinder $a$ the top portion $a'$ of which is removable to form a rectangular opening which extends the whole length of the cylinder, for the introduction of cooling bodies $c$, said opening being provided with vertical side walls $b$ which extend above the opening and support an outer cover $f$. In consequence of its cylindrical shape the tank $a$, $a'$ can be thoroughly scraped, and an outer jacket, as $g$ is preferably provided, which forms with the space inclosed by the side walls $b$ and cover $f$ an annular chamber surrounding the cylinder. At the lowermost part of the cylinder and distributed over the entire length of the same are the several outlets $h$ which open into a common discharge tube $i$.

It is important that the rectangular opening formed in the top part of the cylinder be much less in width than the diameter of the latter, and as the cooling bodies $c$ which are hollow disk-shaped members, are much larger in circumference than the diameter of the opening, said bodies are inserted through the opening with their sides parallel to the sides of the opening, and when inside the tank they are turned into position, with their sides perpendicular to the longitudinal axis of the cylinder.

The disk-shaped, hollow cooling bodies are each provided with an inlet pipe $m$ and an outlet pipe $n$ which communicate therewith at the top portion of the periphery and extend out of the cylinder through the part $a'$ and cover $f$. The interior of each body is provided with a partition wall $j$ which begins at the inner periphery of the body between the inlet and outlet pipes and extends downward, to about the horizontal axis of the cylinder, in a compound curve, and then runs concentric to the inner periphery of the body and terminates a little above said horizontal axis on the opposite side of the outlet pipe from the side on which it started. A radial deflecting wall $l$ extends between the two ends of the wall $j$ from the axis to near the periphery of the body and forms an opening $e$, the purpose of which will be hereinafter explained.

Cooling liquid admitted to the cooling body will flow in successively decreasing circular paths, i. e., from the inlet port $m$ around the outer side of the wall $j$ until it reaches the deflecting wall $l$ which causes the liquid to flow in an opposite direction along the inner side of the wall $j$ and out through the outlet pipe $n$ as indicated by the arrow in Fig. 2.

The air contained in the liquid before this latter had been admitted into the apparatus can escape through the small opening $e$ to the uppermost part of the cooling body, and thence into the outlet tube $n$. In the apparatus hitherto known, the flow of the water was guided by means of horizontal plates, with the unavoidable effect that air pockets and mud deposits were formed in the corners.

The cooling bodies $c$ mounted and fastened to the tank $a$ in the usual manner may be arranged in the shape of alternating large and small plates if an arrangement for a continuous cooling process is desired, in the course of which the warm oil constantly enters at one end of the tank and constantly emerges in cooled condition at the other end. The large cooling bodies are adjoining tightly the inner surface of the tank, and the oil is allowed to pass only through an annular central opening around the circumference of the shaft, while the small cooling bodies allow the oil to pass freely between their circumference and the tank, the shaft passing through them in their center, and is tightly packed against the said cooling bodies. Owing to this arrangement the continuously flowing oil is caused to take a zig-zag-path around the cooling bodies, so that the oil stream is conducted over the whole of the cooling surface, whereby an intimate and prolonged contact of the oil is obtained not only with the cooling bodies $c$, but also with the wall of the tank; this arrangement is of special importance when the latter is also cooled from without in order to increase the efficiency of the apparatus.

Between each two of the cooling bodies, on a shaft $p$ passing through the whole length of the tank $a$ and driven from without, stirring arms $q$ are keyed extending to near the interior wall of the tank and provided at their extremities with the scrapers $r$ for sweeping along the said interior surface and with angle-pieces $s$ bearing the scrapers $t$, which act on the side-faces of each two contiguous cooling bodies $c$. In order to cause the scrapers $t, t$ to bear with yielding pressure against the surfaces of the cooling bodies, they are pivoted around a pin $u$ in the manner of a hinge-joint, and submitted to the action of a single spring $v$, interposed between abutments of the scrapers.

By the arrangement of both scrapers on one common pivot-pin this latter is entirely relieved from any lateral pressure, and owing to the arrangement of one single common spring the scrapers are pressed against the plates elastically, yieldingly, and with the least amount of friction, so that notwithstanding the small unevennesses of the cooling surfaces which are more or less unavoidable, the scrapers tightly bear against the cooling surfaces, and will insure a complete scraping of the same.

The described arrangement of the scrapers with a single pin, and with a single spring of suitable length has the further advantage that owing to the construction of the scrapers, the distance between each two cooling bodies can be considerably reduced in comparison with all previous constructions with elastic scrapers. Consequently in a tank of the same length, a considerably greater number of cooling bodies can be placed according to the present invention, and therefore also a greater cooling surface obtained. By this arrangement, in the same time a considerably greater effect is obtained with the apparatus as also a higher efficiency with regard to the utilization of the refrigerant; the heat absorbing surface remains constant, and therefore, if in the same time with the apparatus according to the present invention more oil can be cooled or the time required for the cooling of the same quantity of oil can be reduced, the absorption of heat from the surrounding atmosphere will be considerably diminished, and this is of particular importance in practice, seeing that the cooling process, especially at low temperatures, is most expensive.

The tank having cylindrical form, its whole surface can be cleaned by means of the scrapers, and the formation of paraffin crusts is completely avoided. The stirring arms effect a thorough mixing of all parts of the material to be cooled, as the whole of the content can be reached by them. Thus the most disadvantageous feature occurring in the known horizontal cooling apparatus, consisting in that parts of the material to be cooled remain unstirred, is also avoided.

Owing to the fact that the scraper-pins are relieved from lateral pressure in the described manner, and that one single spring of appropriate length is employed, a longer duration of the parts in question of the apparatus is obtained.

In the same manner as in the already known apparatus, each cooling body may be fed individually with cooling liquid or this latter may flow through one cooling body after the other, that is, they may be connected in succession.

We claim—

1. A cooling apparatus comprising a horizontally arranged cylindrical tank, a plurality of vertically arranged hollow cooling bodies mounted therein and revoluble stirrers mounted between the cooling bodies and having scrapers to engage the sides of the latter and the interior wall of the tank.

2. A cooling apparatus comprising a horizontally arranged cylindrical tank, a plurality of vertically arranged annular cooling bodies mounted therein of substantially the same diameter as the tank, and cylindrical cooling bodies of smaller diameter than the annular bodies interposed between the latter, thereby forming a zig-zag passage through and around the cooling bodies.

3. A cooling apparatus comprising a horizontally arranged cylindrical tank, a plurality of vertically arranged annular cooling bodies mounted therein of substantially the same diameter as the tank, and cylindrical cooling bodies of smaller diameter than the annular bodies interposed between the latter, and revoluble stirrers mounted between the cooling bodies and having scrapers to engage the sides of the latter and the interior wall of the tank.

4. A cooling apparatus comprising a horizontally arranged cylindrical tank, a plurality of vertically arranged cylindrical cooling bodies mounted therein, and partitions in said bodies to cause a cooling medium in the latter to flow in successively diminishing circular paths.

5. A cooling apparatus comprising a horizontally arranged cylindrical tank, a plurality of vertically arranged cylindrical cooling bodies mounted therein, each alternate body being of substantially the same diameter as the tank, and partitions in said bodies to cause a cooling medium in the latter to flow in successively diminishing circular paths.

6. A cooling apparatus comprising a horizontally arranged cylindrical tank, a plurality of vertically arranged cylindrical cooling bodies mounted therein, and compound curved partitions and radial deflecting walls in said bodies to cause a cooling medium in the latter to flow in successively diminishing circular paths, and to guide the cooling medium to an outlet in the tank.

7. A cooling apparatus comprising a cylindrical horizontal tank, a plurality of cylindrical cooling bodies mounted therein, revoluble arms mounted between the bodies, scrapers on said arms engaging the interior wall of the tank, and scrapers carried by said arms engaging the sides of the bodies.

8. A cooling apparatus comprising a cylindrical horizontal tank, a plurality of cylindrical cooling bodies mounted therein, revoluble arms mounted between the bodies, scrapers on said arms engaging the interior wall of the tank, and yielding scrapers carried by said arms engaging the sides of the bodies.

9. A cooling apparatus comprising a cylindrical horizontal tank, a plurality of hollow cylindrical cooling bodies alternating in diameter vertically arranged therein and provided with inlet and outlet ports, and partitions in said bodies to cause a cooling medium entering the inlets to flow in successively diminishing circular paths toward the outlets.

10. A cooling apparatus comprising a cylindrical horizontal tank, a cooling jacket surrounding the same, a plurality of hollow cylindrical cooling bodies alternating in diameter vertically arranged in the tank and provided with inlet and outlet ports, and partitions in said bodies to cause a cooling medium entering the inlets to flow in successively diminishing circular paths toward the outlets, and radial deflecting walls in said bodies to guide the cooling medium to the outlets.

11. A cooling apparatus comprising a cylindrical horizontal tank, a plurality of hollow cylindrical cooling bodies varying in size mounted therein, a central shaft projecting through the tank, radial arms fixed on the shaft between the bodies, scrapers on the ends of the arms engaging the inner wall of the tank, scrapers pivoted on said arms, and springs interposed between the scrapers to press them against the sides of the cooling bodies.

12. A cooling apparatus comprising a horizontally arranged cylindrical tank having a removable top portion adapted to cover a rectangular opening in the tank, of less width than the diameter of the latter, and a plurality of vertically arranged cooling bodies larger in diameter than the width of the opening mounted in the tank, and adapted to be introduced through said opening.

13. A cooling apparatus comprising a horizontally arranged cylindrical tank having a removable top portion adapted to cover a rectangular longitudinal opening in the tank, of less width than the diameter of the latter, an axial rotatable stirrer shaft in the tank, a plurality of vertically arranged annular cooling bodies mounted in and of substantially the same diameter as the tank and formed with an opening around the shaft, and cylindrical cooling bodies mounted on the shaft of smaller diameter than the annular bodies interposed between the latter thereby forming a zigzag passage through and around the cooling bodies.

14. A cooling apparatus comprising a horizontally arranged cylindrical tank having a removable top portion adapted to cover a rectangular longitudinal opening in the tank, of less width than the diameter of the latter, an axial rotatable stirrer shaft in the tank, a plurality of vertically arranged annular cooling bodies mounted therein of substantially the same diameter as the tank and formed with an opening around the shaft, and cylindrical cooling bodies mounted on the shaft of less diameter than the annular bodies interposed between the latter, thereby forming a zigzag passage through and around the cooling bodies, and stirrers mounted between the cooling bodies and having scrapers to engage the sides of the latter and the interior wall of the tank.

In testimony that we claim the foregoing as our invention, we have signed our names in presence of two subscribing witnesses.

PHILIPP PÖRGES.
RICHARD NEUMANN.

Witnesses:
JOSEF RUBUNEY,
AUGUST FUGGER.

Copies of this patent may be obtained for five cents each, by addressing the "Commissioner of Patents, Washington, D. C."